United States Patent
Olswang et al.

(10) Patent No.: US 12,395,420 B2
(45) Date of Patent: Aug. 19, 2025

(54) SYSTEMS AND METHODS FOR DIGITAL SIGNAL PROCESSING

(71) Applicant: Symetrix, Inc., Mukilteo, WA (US)

(72) Inventors: Benjamin S. Olswang, Seattle, WA (US); Ted Wolfe, Carnation, WA (US); Eli Green, Mountlake Terrace, WA (US)

(73) Assignee: Symetrix, Inc., Mountlake Terrace, WA (US)

( * ) Notice: Subject to any disclaimer, the term of this patent is extended or adjusted under 35 U.S.C. 154(b) by 69 days.

(21) Appl. No.: 18/393,042

(22) Filed: Dec. 21, 2023

(65) Prior Publication Data

US 2025/0211513 A1    Jun. 26, 2025

(51) Int. Cl.
     *H04L 43/55*      (2022.01)

(52) U.S. Cl.
     CPC .................................. *H04L 43/55* (2022.05)

(58) Field of Classification Search
     CPC .......... H04L 43/08; H04L 43/50; H04L 43/55
     See application file for complete search history.

(56) References Cited

U.S. PATENT DOCUMENTS

| | | | |
|---|---|---|---|
| 5,388,261 | A | 2/1995 | Anderson et al. |
| 6,738,964 | B1 | 5/2004 | Zink et al. |
| 8,499,262 | B1 | 7/2013 | Perry |
| 10,114,917 | B1 | 10/2018 | Venkataramani et al. |
| 10,417,159 | B2 * | 9/2019 | Bennett ............... G06F 13/4027 |
| 2005/0023656 | A1 * | 2/2005 | Leedy ................... H10D 88/00 |
| | | | 438/106 |
| 2006/0122814 | A1 | 6/2006 | Beens et al. |
| 2008/0164907 | A1 * | 7/2008 | Mercaldi-Kim ..... H03K 19/177 |
| | | | 326/41 |
| 2012/0079163 | A1 * | 3/2012 | Bennett ................... G11C 5/06 |
| | | | 710/316 |
| 2021/0326111 | A1 | 10/2021 | Langhammer |
| 2023/0023545 | A1 | 1/2023 | Bass |
| 2023/0169251 | A1 * | 6/2023 | Riepe .................... G06F 30/347 |
| | | | 716/100 |

OTHER PUBLICATIONS

International Search Report and Written Opinion mailed Feb. 7, 2025, issued in corresponding International Application No. PCT/US2024/059850, filed Dec. 12, 2024, 8 pages.

* cited by examiner

*Primary Examiner* — Khanh C Tran
(74) *Attorney, Agent, or Firm* — CHRISTENSEN O'CONNOR JOHNSON KINDNESS PLLC

(57) ABSTRACT

A method for creating a digital signal processing (DSP) module grid on a computer user interface, the method including inserting a first module and a second module of the DSP module grid, automatically aligning the first module with the second module, automatically connecting at least a first node of the first module to at least a second node of the second module with a first connection, and inserting a third module between the first module and the second module, where, when the third module is inserted, the first module and second module automatically shift to make space for the third module, and the third module is automatically aligned with the first module and the second module.

20 Claims, 13 Drawing Sheets

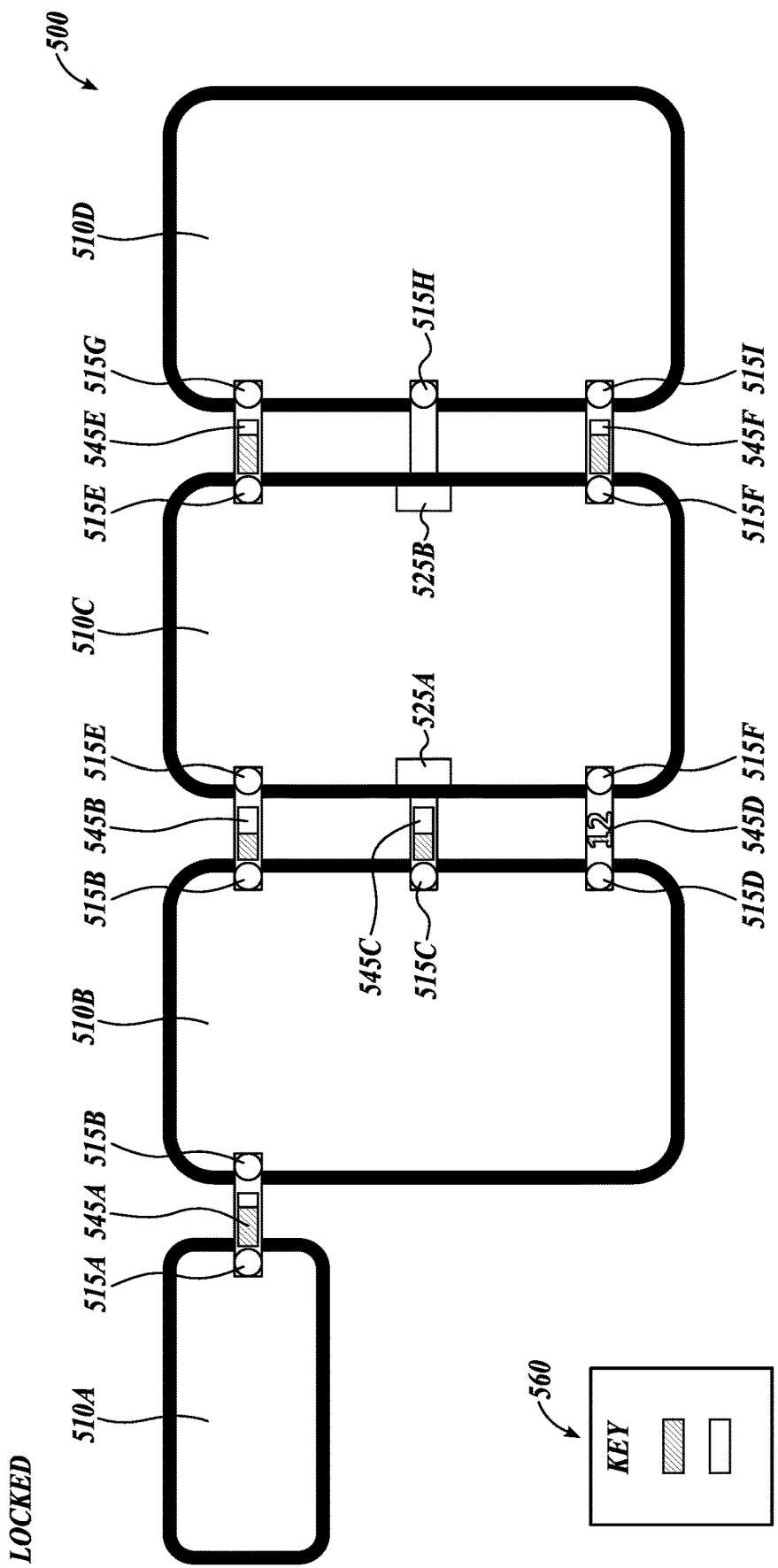

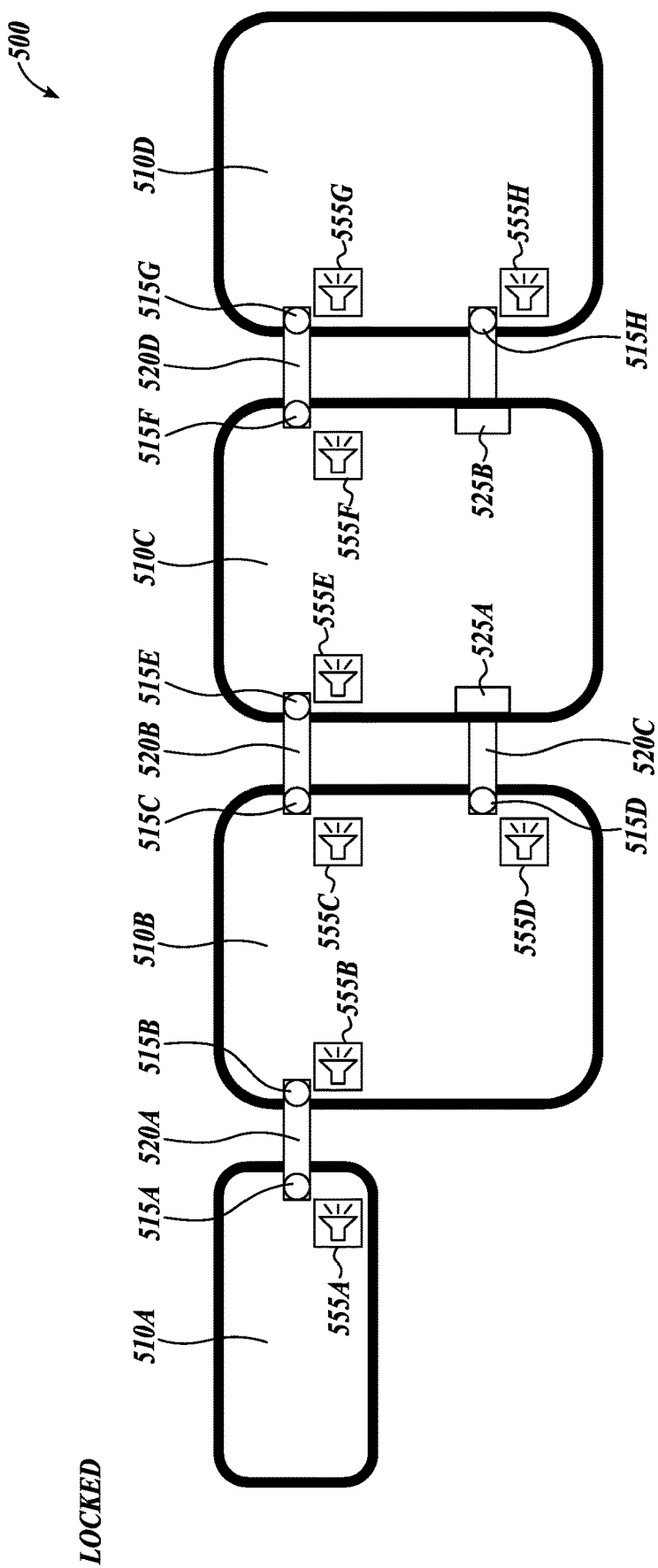

SYSTEMS AND METHODS FOR DIGITAL SIGNAL PROCESSING

BACKGROUND

Conventionally, systems, methods, and software for designing and implementing digital signal processing (DSP) architectures require highly skilled and knowledgeable users. For example, conventional DSP design software and methods require users to manually connect inputs and outputs of modules together using virtual, hand-drawn wires. This process is slow, tedious, and requires a skilled user to spend copious amounts of time maintaining and rearranging the wires on a screen. Further, conventional software allows users to add only a single module at a time to their DSP design, and copy/paste functionalities still require additional work to correctly arrange wires and module connections. In addition, stereo and multi-channel modules pose additional challenges to users because duplicate settings and wiring paths must be maintained. Furthermore, even in operational modes, conventional DSP software often makes it difficult to test the DSP system, because tools are omitted or difficult to access. This results in conventional DSP software being nonintuitive, tedious, disorganized, and prone to error.

Accordingly, intuitive, quick, automatic, and organized methods and software for DSP design are needed.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, disclosed herein is a method for creating a digital signal processing (DSP) module grid on a computer user interface; the method includes inserting a first module and a second module of the DSP module grid, automatically aligning the first module with the second module, automatically connecting at least a first node of the first module to at least a second node of the second module with a first connection, and inserting a third module between the first module and the second module, wherein, when the third module is inserted, the first module and second module automatically shift to make space for the third module, and the third module is automatically aligned with the first module and the second module.

In yet another aspect, disclosed herein is a method for creating a digital signal processing (DSP) module grid on a computer user interface, where the DSP module grid comprises a plurality of cells, and where the plurality of cells forms a plurality of rows and a plurality of columns. In some embodiments, the method includes inserting a plurality of modules over the plurality of cells, each module of the plurality of modules having one or more nodes, for the modules that are inserted in a same row, aligning the modules within the same row of the plurality of rows, connecting the one or more nodes of a given module of the plurality of modules with the one or more node of a first adjacent module of the plurality of modules to form one or more connections, and if the given module of the plurality of modules includes an absent node (i.e., a missing node), functionally bypassing the absent node so that the absent node is not connected to a node of the first adjacent module in the same row of the plurality of rows, where the first adjacent module maintains one or more connections with a second adjacent module.

DESCRIPTION OF THE DRAWINGS

The foregoing aspects and the attendant advantages of this invention will become more readily appreciated as the same become better understood by reference to the following detailed description, when taken in conjunction with the accompanying drawings, wherein:

FIG. 5A is a first module, a second module, and a third module, having a plurality of connections, in accordance with the present technology;

FIG. 5C shows a plurality of modules, each having a signal generator, in accordance with the present technology;

DETAILED DESCRIPTION

Figure 1A:
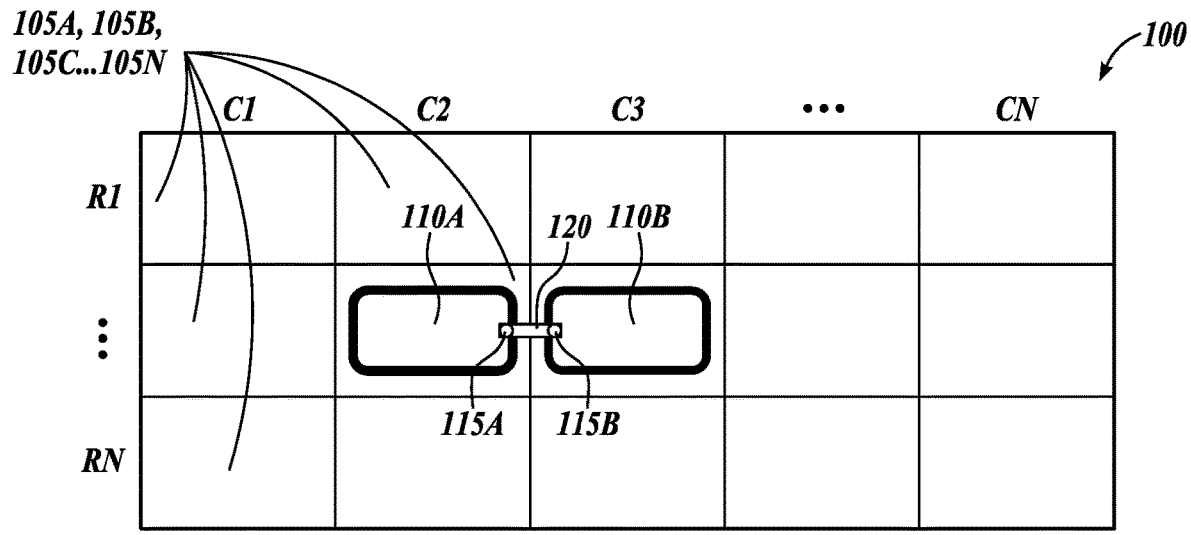
FIG. 1A is an example digital signal processing (DSP) grid having a first module and a second module, in accordance with the present technology.

While illustrative embodiments have been illustrated and described, it will be appreciated that various changes can be made therein without departing from the spirit and scope of the invention.

In some embodiments, described herein is a digital signal processing (DSP) module grid. In some embodiments, the DSP module grid includes a plurality of modules. In some embodiments, each module of the plurality of modules represents a piece of or a portion of a piece of hardware, such as audio hardware or manufacturing hardware. In some embodiments, the DSP modules grid is configured to automatically align and automatically connect to one another. In some embodiments, each module of the plurality of modules are configured to align in a same row or column of the DSP module grid. In some embodiments, each module of the plurality of modules is configured to shift when a module is added to the DSP module grid. For example, when two modules of the plurality of modules are added to the DSP module grid, the two modules are configured to shift to accommodate a third module inserted between the two modules. In some embodiments, the DSP module grid is further configured to automatically align and connect the third module to the two modules.

In some embodiments, one or more of the modules of the plurality of modules include an absent node. In such embodiments, the DSP module grid may be further configured to bypass the blank node while maintaining the connection between the other modules of the plurality of modules. In some embodiments, each module of the plurality of modules includes one or more properties. In some embodiments, the one or more properties can be modified to create new connections, new types of modules, and the like.

In some embodiments, the DSP module grid may be further configured to have a locked mode. In such a locked mode, the plurality of modules may be prevented from being moved, connected, or inserted. In some embodiments, in the locked mode, a signal generator and/or a signal meter may be added to the DSP module grid to monitor a signal strength, clipping, a functionality of a node, or the like. In some embodiments, the signal generator is a tone generator.

As defined herein, the term "grid" is understood to mean a two-dimensional array of rows and columns of an integral size. Accordingly, the term "cell" is understood to mean an intersection of a single row and column in a grid. As defined herein, the term "module" is understood to mean a component of signal processing having one or more inputs and/or one or more outputs (referred to herein as "nodes", collectively) which may take up any number of cells in a grid, including a single cell. A module may have any number of output nodes or input nodes. In some embodiments, the number of nodes (inputs and/or outputs) is determined by the type of component of signal processing the module is, such as an equalizer, a mixer, or the like. As described herein, an "absent node" is the absence of a node. An absent node is understood to be a lack of a node (a missing node) and is not a structural component of a module. Instead, an absent node characterizes a module that does not have either an input or an output node (or both) in a place where such a node would be normally expected.

Further, as defined herein, a "channel" is understood to mean a single atomic quantity of media (such as audio, video, control, or the like) that cannot be further divided. A "signal", as used herein is understood to mean one or more channels of correlated media, which is treated as a single component for the purposes of connection, analysis, and documentation. A "mult" as used herein is understood to be a replication of an output signal for naming or connection purposes. As described herein, a signal path is understood to mean the totality of signal processing within a given grid.

As used herein, the term "insert" is understood to mean to place a new module into one or more cells, preserving previous properties and connections of one or more already placed modules by shifting the modules to accommodate the new module. To "replace" a module is understood to mean to place a new module into one or more cells, removing any properties or connections of one or more already placed modules.

FIG. 1A is an example digital signal processing (DSP) module grid 100 having a first module 110A and a second module 110B, in accordance with the present technology. In some embodiments, the DSP module grid 100 includes a plurality of cells 105A, 105B, 105C . . . 105N arranged in a plurality of rows R1 . . . RN and a plurality of columns C1, C2, C3 . . . CN. In the illustrated embodiment, the DSP module grid 100 includes a first module 110A, a second module 110B, and a connection 120 between the first module 110A and the second module 110B.

In some embodiments, the DSP module grid 100 is displayed on a computer user interface (e.g., a computer display). While 15 cells 105A, 105B, 105C . . . 105N are illustrated, it should be understood that any number of cells may be included in the plurality of cells 105A, 105B, 105C . . . 105N.

In some embodiments, the first module 110A and the second module 110B are collectively referred to as a plurality of modules 110. In some embodiments, the plurality of modules 110 can include any number of modules, including a single module, two modules, three modules, and the like. In some embodiments, each module 110A, 110B represents a component of a DSP design (or a signal processing component). In some embodiments, each module 110A, 110B is a type of audio component. In such embodiments, types of components include, for example, audio inputs, equalizers (such as a parametric equalizers), gains, matrices, mixers, audio outputs, or the like. In some embodiments, the type of each module 110A, 110B determines a specific number and type of properties of the modules 110A, 110B, as described in further detail herein, in FIG. 2A. For example, in some embodiments, the type of module determines how many nodes (input nodes and/or output nodes) are incorporated into the module 110A, 110B. In some embodiments, each module represents one or more pieces of hardware in a DSP design. In some embodiments, two or more modules may be contained in a single piece of hardware in a DSP design. In this manner, the modules 110A, 110B may be theoretical components of a theoretical DSP design or actual hardware in a real-world DSP set up. It should be understood that in some embodiments, the DSP design is entirely conceptual, and does not represent one or more pieces of hardware. Further, in some embodiments, the DSP design is configured to be implemented through software, such as within a single computer.

Figure 1B:
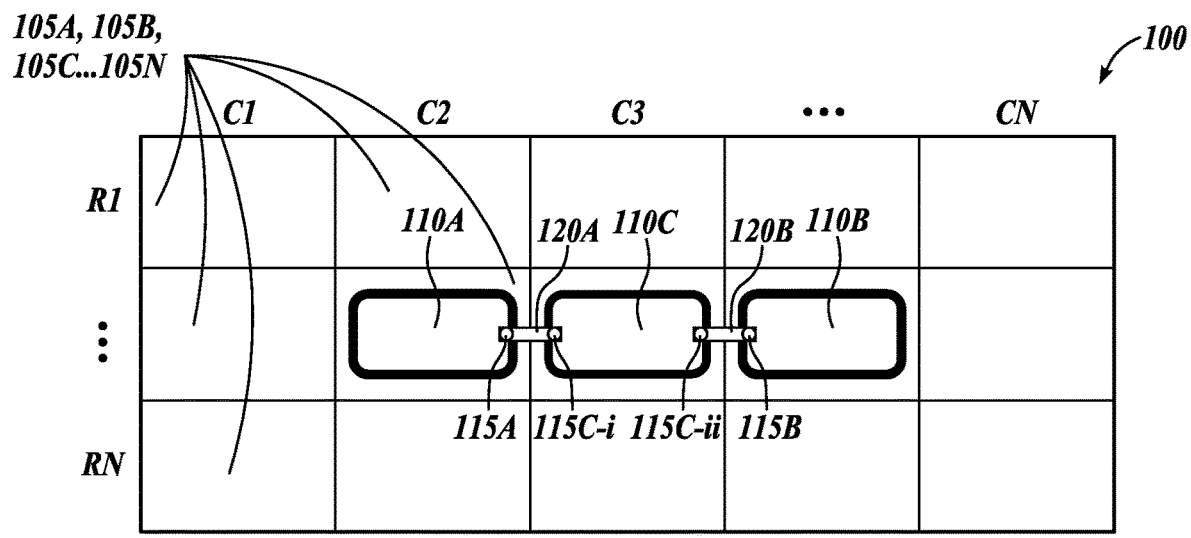
FIG. 1B is an example digital signal processing (DSP) grid having a first module, a second module, and a third module in accordance with the present technology.

In some embodiments, each module 110A, 110B includes one or more nodes 115A, 115B. In some embodiments, each module 110A, 110B includes one or more types of nodes. As described herein, a node 115A, 115B may be an input, an output, or an input/output (as shown in FIG. 1B). Further, types of nodes include types or inputs or types of outputs, as explained in more detail in FIG. 2A. For example, such as shown in FIG. 1A, the first module 110A includes an output node 115A. Further, the second module 110B includes an input node 115B. It should be appreciated that each node 115A, 115B represents either an input or an output. In operation, a signal may travel through some or all of the nodes 115A, 115B. It should also be understood that as described herein, a node is not limited to one cell of the DSP grid module 100 and may be located on any position of the modules 110A, 110B, 110C.

Figure 2A:
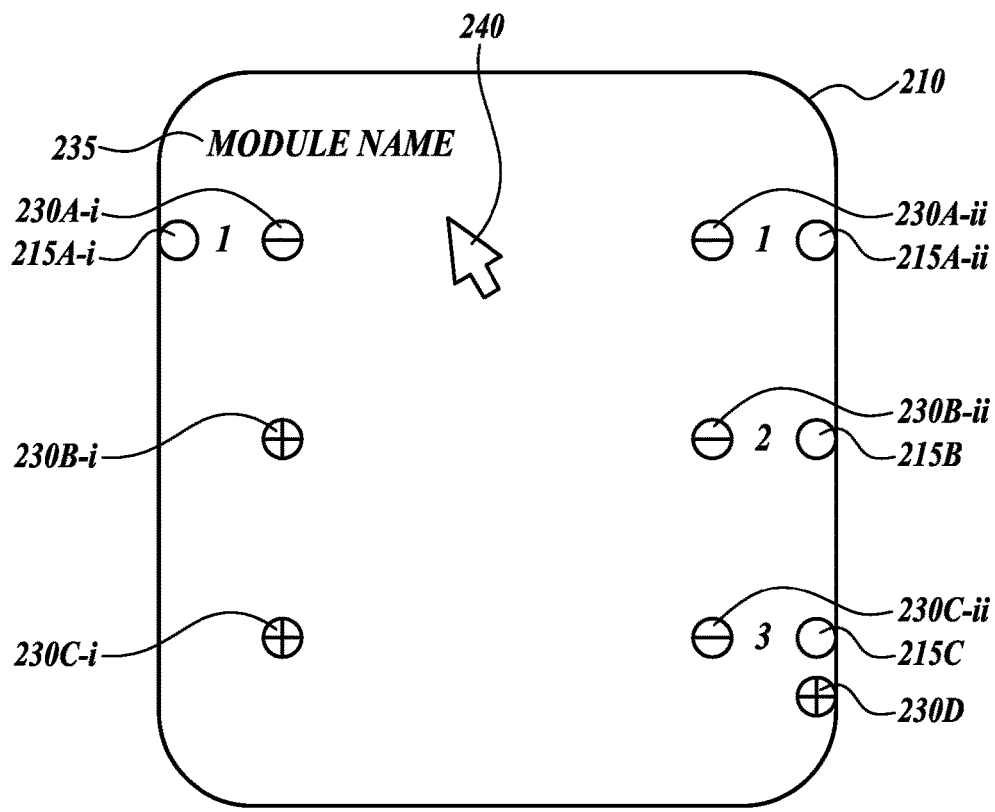
FIG. 2A is an example module, in accordance with the present technology.
Figure 2B:
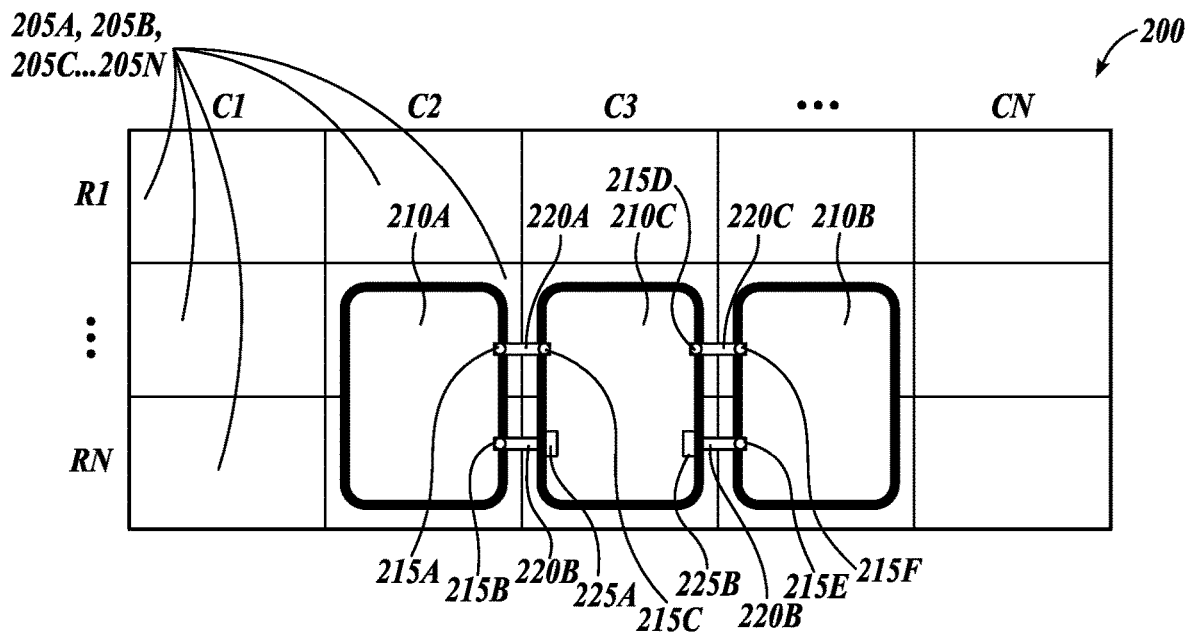
FIG. 2B is an example digital signal processing (DSP) grid having a first module, a second module, and a third module in accordance with the present technology.

In some embodiments, each module 110A, 110B fills one cell 105A, 105B, 105C . . . 105N of the DSP module grid 100, although in some embodiments a number of nodes 115 or a number of types of nodes may determine how many cells of the plurality of cells 105A, 105B, 105C . . . 105N each module 110A, 110B fills, as shown and explained in FIG. 2B.

In operation, when the first module 110A and the second module 110B are inserted into the DSP module grid 100, these modules are automatically aligned in a row R and/or a column C. While the first module 110A and the second module 110B are shown in a middle row of the DSP module grid 100, the first module 110A and the second module 110B may be in any row R or column C. In some embodiments, inserting the first module 110A and the second module 110B includes dragging each module 110A, 110B into one or more cells 105A, 105B, 105C . . . 105N of the DPS grid 100. In some embodiments, when the first module 110A and the second module 110B are dragged into a same row R, a connection 120 is automatically formed between them. In some embodiments, when the first module 110A and the second module 110B are inserted into the DSP module grid 100, a first connection 120 is automatically formed between the first node 115A of the first module 110A and the second node 115B of the second module 110B. It should be understood that either module of the first module 110A and the second module 110B may be inserted into the DSP module grid 100 first. In some embodiments, the DSP module grid 100 is configured to determine the type of node of each node 115A, 115B and to automatically create an appropriate connection 120 between the first module 110A, 110B. For example, in FIG. 1A, first connection 120 is formed between an output node 115A of first module 110A and an input node 115A of the second module 115B. In some embodiments, such as when the first module 110A and the second module 110B are dragged into a same column, for example C2, the first connection 120 is not formed. In some embodiments, this is because the DSP module grid 100 recognizes the first module 110A and the second module 110B as two separate components of the DSP module grid 100 However, in some embodiments, the opposite is true, that is, the first connection 120 is automatically formed when the first module 110A and the second module 110B are inserted into the same column (such as column C2) and not the same row R. In some embodiments, inserting the first module 110A and the second module 110B automatically aligns the first module 110A and the second module 110B in the same row R, unless otherwise moved by a user. In some embodiments, inserting the first module 110A and the second module 110B automatically aligns the first module 110A and the second module 110B in the same column C unless otherwise moved by a user. While FIG. 1A shows modules 110A, 110B, 110C each occupying a single cell, it should be understood that in some embodiments, modules 110A, 110B, 110C may overlap with one another.

Figure 1C:
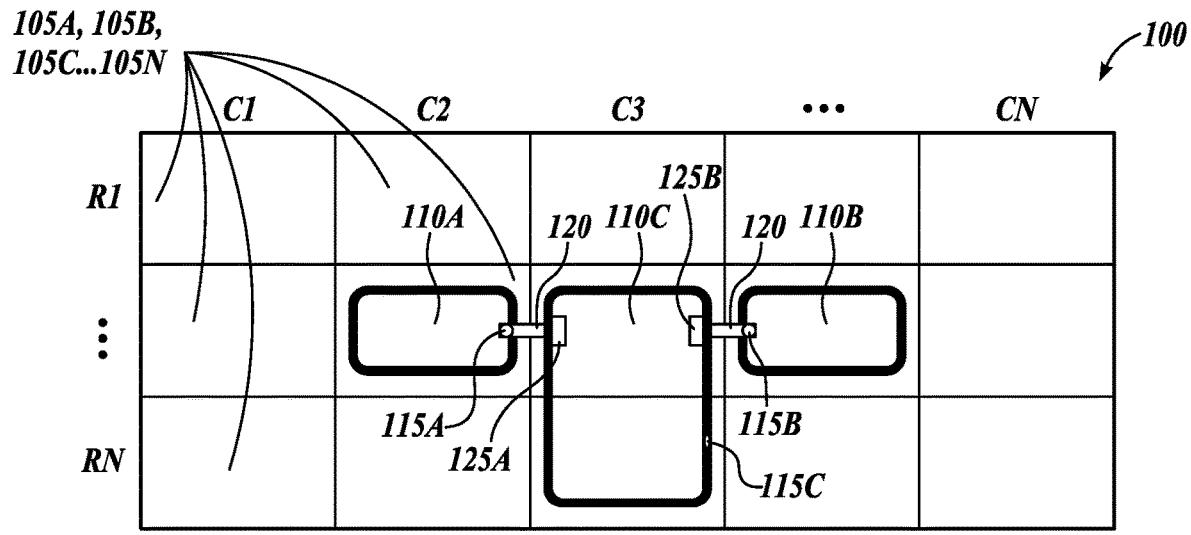
FIG. 1C is an example digital signal processing (DSP) grid having a first module, a second module, and a third module in accordance with the present technology.

FIG. 1B is an example digital signal processing (DSP) grid 100 having a first module 110A, a second module 110B, and a third module 110C in accordance with the present technology. In some embodiments, the DSP module grid 100 is the DSP module grid 100 of FIG. 1A. In some embodiments, the DSP module grid includes a plurality of cells 105A, 105B, 105C . . . 105N arranged in a plurality of rows R1 . . . RN and a plurality of columns C1, C2, C3 . . . CN. In some embodiments, the DSP module grid 100 further includes a third module 110C. In some embodiments, the first module 110A, the second module 110B, and the third module 110C may collectively be referred to as a plurality of modules 110. It should be understood that the plurality of modules 110 may be described as adjacent to one another. For example, as shown in FIGS. 1B and 1C, the first module 110A may be considered adjacent to the third module 110C. Similarly, the third module 110C may be considered adjacent to the second module 110B. In some embodiments, the first module 110A may be considered a first adjacent module 110A, and the second module 110B may be considered a second adjacent module 110B. Further, in some embodiments, the third module 110C may be considered an adjacent module to the first module 110A, and the second module 110B may be considered the next adjacent module to the first module 110A.

In some embodiments, a third module 110C is inserted into the DSP module grid 100. In some embodiments, similar to the first module 110A and the second module 110B, the third module 110C represents a component of a DSP design. In some embodiments, the third module 110C is a type of component. In such embodiments, types of components include, for example, audio inputs, equalizers (such as a parametric equalizers), gains, matrices, mixers, audio outputs, or the like. In some embodiments, the type of each module determines a number of properties of the third module 110C as described in further detail in FIG. 2A. In some embodiments, the third module 110C includes a third input node 115C-i and a third output node 115C-ii. In some embodiments, the node may be a type of input node or a type of output node. As shown in FIG. 1B, the third module 110C may include a third input node 115C-i and a third output node 115C-ii.

In operation, when the third module 110C is inserted between the first module 110A and the second module 110B, the first module 110A, the second module 110B, or both the first module 110A and the second module 110B shift along the row R of the DSP module grid to make space for the third module 110C. In some embodiments, the third module 110C automatically aligns in the same row R of the DSP module grid 100. In embodiments where the modules 110A, 110B are automatically aligned in a column C, the third module 110C may automatically align in the same column C of the DSP module grid 100 . . . In some embodiments, the third module 110C automatically forms a first connection 120A and a second connection 120B between the first module 110A and the second module 110B, respectively. In some embodiments, the input node 115C-i of the third module 110C automatically connects to the first node 115A of the first module 110A, and the output node 115C-ii of the third module 110C automatically connects to the second node 115B of the second module 110B. In such embodiments, the first module 110A, the second module 110B, and the third module 110C are automatically aligned and connected. In some embodiments, a user may replace a module by selecting a cell in the DSP module grid that already includes a module and inserting a new module into the grid. In such embodiments, the new module would replace the module that was originally in the cell of the DSP module grid.

FIG. 1C is an example digital signal processing (DSP) module grid 100 having a first module 110A, a second module 110B, and a third module 110C in accordance with the present technology. In some embodiments, the DSP module grid 100 is the DSP module grid 100 of FIG. 1A. In some embodiments, the DSP module grid includes a plurality of cells 105A, 105B, 105C . . . 105N arranged in a plurality of rows R1 . . . RN and a plurality of columns C1, C2, C3 . . . CN. In some embodiments, the DSP module grid 100 includes the first module 110A and the second module 110B. In some embodiments, the DSP module grid 100 further includes a third module 110C. In some embodiments, the first module 110A, the second module 110B, and the third module may collectively be referred to as a plurality of modules 110.

In some embodiments, the third module 110C includes an absent input node 125A and an absent output node 125B. As defined herein, an absent node 125A, 125B symbolically represents the lack of a node. Accordingly, when a module 110C has an absent node, there is nothing to connect to other nodes (such as 115A, 115B in FIG. 1C). For example, the third module 110C may not include a respective input node, output node, or a combination thereof capable of being connected to the first module 110A or to the second module 110B. While the absent nodes 125A, 125B are illustrated as a rectangle, it should be understood that this is merely a symbol representing the absence of a node, and in some embodiments, there may be no visual indicator that the third module 110C includes absent nodes 125A, 125B. It should also be appreciated that the absent node is not a structural component of the module, but rather the absence of a node (input or output node). Accordingly, there are no signals on that row of the module. In operation, an input searches to the left until it finds an output signal on a module. Because an absent node is not, in fact, a node, the signal bypasses the so-called absent node. The third module may include additional nodes, such as 115C, that are not connected to other nodes of the adjacent modules 110A, 110B. In some embodiments, the additional output node 115C is not connected to another node because the user has not inserted a module configured to connect to the node 115C.

In some embodiments, when the third module 110C includes absent nodes 125A, 125B, the first connection 120 between the first module 110A and the second module 110B is maintained.

In operation, when the third module 110C is inserted, the absent nodes 125A, 125B are bypassed so that the first connection 120 is maintained between the first module 110A and the second module 110B. In some embodiments, the third module 110C may be modified, as explained in detail in FIG. 3A to include an absent node 125. In such embodiments, once the third module 110C is modified to include the absent nodes 125A, 125B, the absent node is bypassed, either forming or maintaining a first connection 120 between the first module 110A and the second module 110B. In some embodiments, the alignment of the first module 110A, the second module 110B, and the third module 110C is also maintained.

Figure 1D:
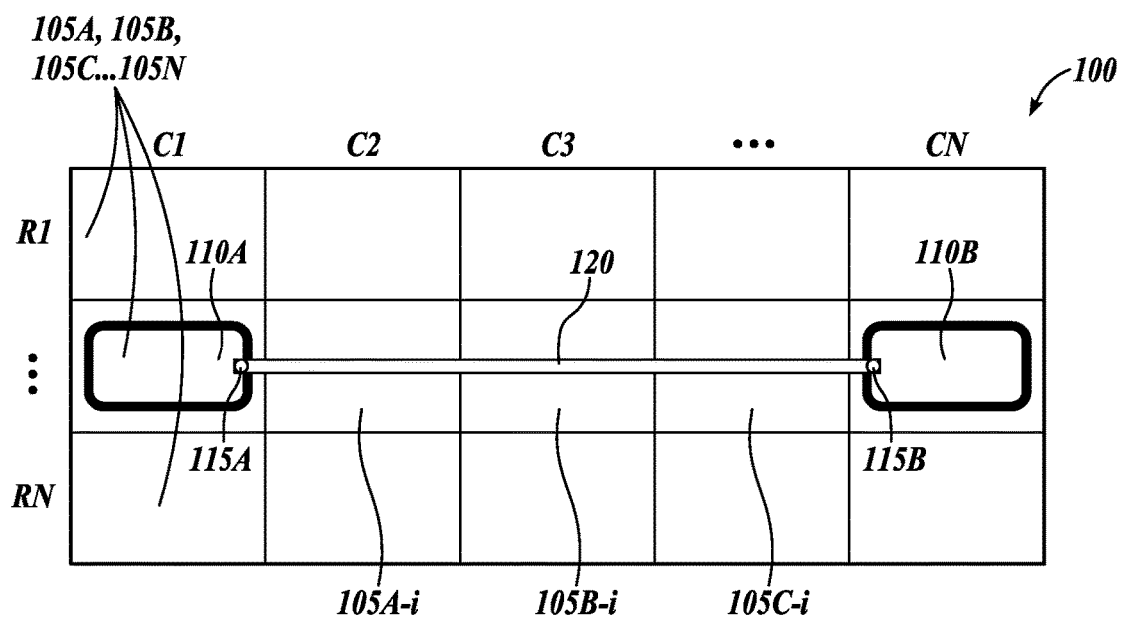
FIG. 1D is an example digital signal processing (DSP) grid having a first module and a second module, in accordance with the present technology.

FIG. 1D is an example digital signal processing (DSP) module grid 100 having a first module 110A and a second module 110B, in accordance with the present technology. In some embodiments, the DSP module grid 100 includes a plurality of cells 105A, 105B, 105C . . . 105N forming a plurality of rows R1 . . . RN and a plurality of columns C1, C2, C3 . . . . CN. In some embodiments, the DSP module grid 100 further includes a first module 110A and a second module 110B, and a connection 120 between the first module 110A and the second module 110B. In some embodiments, the DSP module grid includes one or more blank cells 105A-i, 105B-i, 105C-i.

In some embodiments, a first connection 120 forms between adjacent modules (such as the first module 110A and the second module 110B) over any number of blank cells 105A-i, 105B-i, 105C-i. In some embodiments, the first connection 120 may span any number of blank cells 105A-i, 105B-i, 105C-i. While three blank cells 105A-i, 105B-i, 105C-i are illustrated in FIG. 1D, any number of blank cells may be between the first module 110A and the second module 110B. The first node 115A may connect with the second node 115B over any number of blank cells.

FIG. 2A is an example module 210, in accordance with the present technology. In some embodiments, module 210 may be any one of modules 110A, 110B, or 110C in FIGS. 1A-1D. In some embodiments, module 210 includes a first node 215A-i having an input node type, a second node 215A-ii having an output node type, a third node 215B having an output node type, and a fourth node 215C having an output node type. In some embodiments, the module 210 may also include one or more node modifiers 230A-i, 230A-ii, 230B-i, 230B-ii, 230C-i, 230C-ii, 230D (also referred to herein as "module modifiers"). Also illustrated in FIG. 2A is a mouse pointer 240. Each node 215 (215A-i, 215A-ii, 215B, 215C) of the module 210 may have a node type. As described herein, a node type may be selected from an input node type or an output node type.

As shown in FIG. 2A, module 210 includes a first node 215A-i having an input node type and a second node 215A-ii, having an output node type. In some embodiments, the first node 215A-i and second node 215A-ii may be modified with respective first node modifier 230A-i and second node modifier 230A-ii. In some embodiments, the first node modifier 230A-i and second node modifier 230A-ii are configured to delete the first node 215A-i and/or the second node 215A-ii, respectively, the type of either the first channel node 215A-i or the second node 215A-ii, respectively, or a combination thereof. In some embodiments, such as when the first node 215A-i has an input node type, the first node modifier 230A-i may be configured to add additional nodes, each having an input node type. In some embodiments, the second node modifier 230A-ii may be configured to add another node having an output type, or to mult (i.e., split) a signal transmitted from module 210 at second node 215A-ii into a "first second" node and a "second second" node. and/or name the signal transmitted from second node 215A-ii. In some embodiments, the first node modifier 230A-i and/or the second node modifier 230A-ii may further be configured to change a mute status of first node 215A-i or second node 215A-ii, respectively, where the mute status may be muted or unmuted. In some embodiments, the first node modifier 230A-i and/or the second node modifier 230A-ii may remove a node (i.e., add an absent node).

In some embodiments, module 210 further includes a third node 215B having an output node type. Like the first node 215A-i, respective third node modifier 230B-i may be configured to modify the third node 215B. In some embodiments, the third node modifier 230B-ii, may be further configured to mult a signal transmitted from module 210 at third node 215B (as in, split the signal at third node 215B into a first third node and a second third node) and/or name the signal transmitted from third node 215B.

In some embodiments, fourth node modifier 230B-i is configured to add an adjacent node. In some embodiments, adjacent node modifier 230B-i is configured to add an adjacent node having an output type. Adjacent node modifier 230B-i may modify the adjacent node in the manner described herein, i.e., the presence or absence of the adjacent node, the name of the adjacent node, the mute status of the adjacent node, the node type of the adjacent node, and the like.

Also shown in FIG. 2A is a fourth node 215C. As described regarding the first node 215A-i, the second node 215A-ii, and the third node 215B, the fourth node 215C may also include respective fifth node modifier 230C-i. In some embodiments, the fifth node modifier 230C-i may be further configured to mult a signal at output type node 215C (as in, split a signal at fourth node 215C into a first fourth node and a second fourth node), remove a node (i.e., add an absent node), and/or name the signal transmitted from fourth node 215C. In some embodiments, the fifth node modifier 230C-ii may further be configured to change a mute status of node 215C, where the mute status may be muted or unmuted.

In some embodiments, there may also be a second adjacent node modifier 230C-i. In some embodiments, second adjacent node modifier 230C-i may add or remove a second adjacent node (shown in FIG. 2A as removed or "absent"). In some embodiments, second adjacent node modifier 230C-i may modify the second adjacent node, including but not limited to, naming a signal received by second adjacent node, muting or unmuting second adjacent node, removing a node (i.e., adding an absent node) and/or changing the node type of second adjacent node from input type node to output type node, and vice versa.

While four nodes 215A-i, 215A-ii, 215B, 215C are illustrated in FIG. 2A, it should be understood that any number of nodes 215A-i, 215A-ii, 215B, 215C may be included in module 210. Module modifier 230D may be configured to add additional nodes having either input or output node types. Further, in some embodiments, the type of node or the type of module determines what the node modifiers 230A-i, 230A-ii, 230B-i, 230B-ii, 230C-i, 230C-ii, 230D are configured to modify. For example, for a module that has only an output type node, the respective, adjacent node modifier may not include the function of adding an input type node.

Further, in some embodiments, hardware represented by the module may determine what the node and/or module modifiers 230A-i, 230A-ii, 230B-i, 230B-ii, 230C-i, 230C-ii, 230D are configured to modify. For example, in a speaker that only has two physical inputs, the node modifiers 230A-i, 230A-ii, 230B-i, 230B-ii, 230C-i, 230C-ii, 230D may only be able to add and/or modify two nodes having input node types. In some embodiments, one or more of the node modifiers 230A-i, 230A-ii, 230B-i, 230B-ii, 230C-i, 230C-ii, 230D may be omitted. Further, in some embodiments, the module type (e.g., equalizer) may determine what node and/or module modifiers 230A-i, 230A-ii, 230B-i, 230B-ii, 230C-i, 230C-ii, 230D are configured to modify.

In operation, when a mouse (or mouse pointer) 240 is hovered over the module 210, or any node, one or module properties are displayed. For example, the module name 235 may be displayed. In some embodiments, the node modifiers 230A-i, 230A-ii, 230B-i, 230B-ii, 230C-i, 230C-ii, 230D are also displayed, so that the nodes and/or module can be modified by a user of the DSP module grid. In some embodiments, the node modifiers 230A-i, 230A-ii, 230B-i, 230B-ii, 230C-i, 230C-ii, 230D include a label, to inform a user of the functionality of the node modifiers 230A-i, 230A-ii, 230B-i, 230B-ii, 230C-i, 230C-ii, 230D.

In some embodiments, regardless of how each module 210 of a plurality of modules (such as plurality of modules 110 in FIGS. 1A-1D) is modified, the alignment of the plurality of modules is maintained. In some embodiments, when the nodes of the module 210 are modified, connections between adjacent modules (such as modules 110A, 110B, and 110C of FIGS. 1A-1D) are maintained when possible. For example, if the first node 215A-i and the second node 215A-ii are not modified, but the third node 215B is deleted, the connection between the first node and any adjacent modules would be preserved, while the connection between the second node would be removed, as there would no longer be a node there. In some embodiments, such as shown in FIG. 2B, the third node 215B would become an "absent node" as described herein, and a connection could automatically be formed by two modules on either side of the module 210, bypassing the absent node.

FIG. 2B is an example digital signal processing (DSP) module grid 200 having a first module 210A, a second module 210B, and a third module 210C (also referred to herein as a plurality of modules 210) in accordance with the present technology. In some embodiments, the DSP module grid 200 includes a plurality of cells 205A, 205B, 205C . . . 205N forming a plurality of rows R1 . . . RN and a plurality of columns C1, C2, C3 . . . CN. In some embodiments, the DSP module grid 200 further includes a first module 210A, a second module 210B, and a third module 210C. In some embodiments, there is a connection 220A between the first module 210A and the third module 210C, a connection 220C between the third module 210C and the second module 210B, and a connection 220B between the first module 210A and the second module 210B.

In some embodiments, a number of nodes 215 (such as nodes 215A-i, 215A-ii, 215B, 215C) of a given module 210 determines how many cells of the plurality of cells 205A, 205B, 205C . . . 205N the module 210 fills. In some embodiments, a number of types of nodes 215 (215A-i, 215A-ii, 215B, 215C) of a given module 210 determines how many cells of the plurality of cells 205A, 205B, 205C . . . 205N the module 210 fills. For example, as illustrated in FIG. 2B, first module 210A may include a first node 215A and a second node 215B, so first module 210A fills two cells of the DSP module grid 200. In other embodiments, first module 210A may include a first type of node 215A (such as first outputs, including any number of nodes) and a second type of node 215B (such as second outputs, including any number of nodes). In such embodiments, because first module 210A includes two types of nodes, first module 210A fills two cells of the DSP module grid 200.

In some embodiments, the third module 210C includes absent nodes 225A, 225B. In such embodiments, the connection 220B between the first module 210A and the second module 210B would connect over the absent nodes 225A, 225B between the first module 210A and the second module 210B in the manner shown in FIG. 1D.

FIGS. 3A-3D are example process blocks of using a digital signal processing (DSP) module grid 300, in accordance with the present technology. In some embodiments, the DSP module grid 300 includes a plurality of cells 305A, 305B, 305C . . . 305N. In some embodiments, the plurality of cells 305A, 305B, 305C . . . 305N are arranged in a plurality of rows R1 . . . RN and a plurality of columns C1, C2, C3 . . . CN.

Figure 3A:
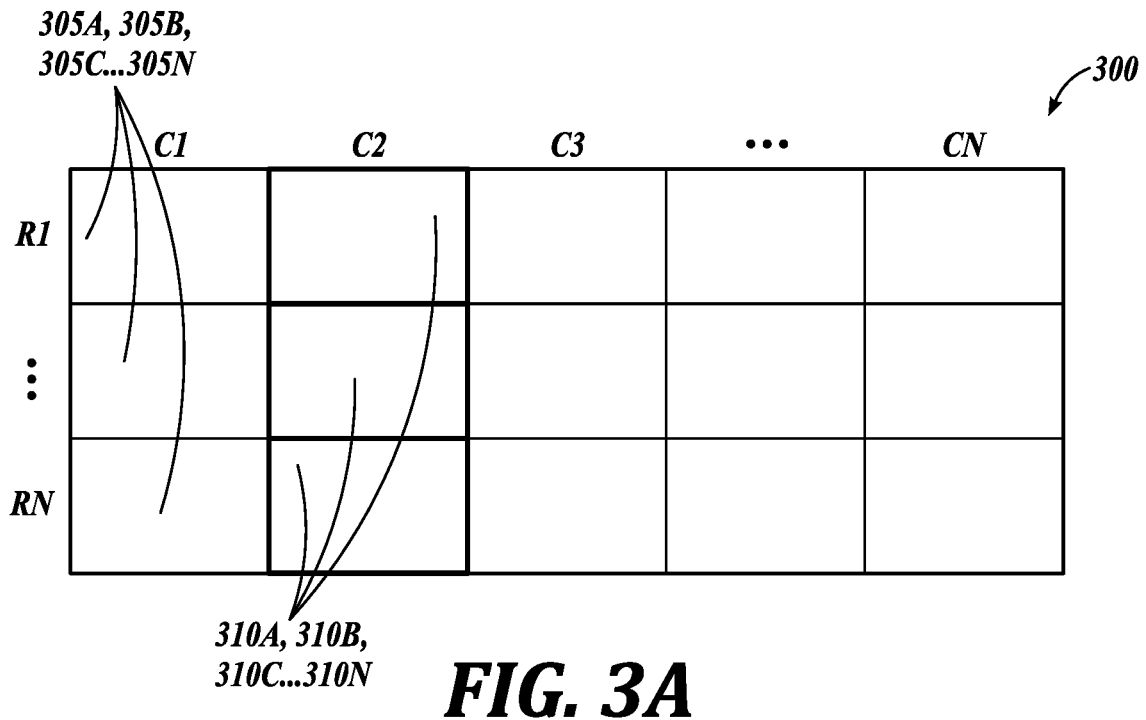
FIGS. 3A-3D are example process blocks of using a digital signal processing (DSP) grid, in accordance with the present technology.

In some embodiments, one or more blank cells 310A, 310B, 310C . . . 310N are selected, as shown in FIG. 3A as bolded cells 310A, 310B, 310C . . . 310N. In some embodiments, the one or more blank cells 310A, 310B, 310C . . . 310N may be in a same column C2 of the DSP module grid 300. In some embodiments, the one or more blank cells 310A, 310B, 310C . . . 310N may be in a same row. In some embodiments, the one or more blank cells 310A, 310B, 310C . . . 310N multiple columns and/or rows of the DSP module grid. In some embodiments, an array of blank cells 310A, 310B, 310C . . . 310N such as a two by three blank cell array may be selected. In some embodiments, one or more non-consecutive cells may be selected. For example, a user may select the cell at C1, R1 and the cell at C1, R3.

In some embodiments, a type of module may be selected. In some embodiments, the type of module is selected from a plurality of modules organized in a list, drop down menu, or the like. In some embodiments, the type of module is selected by typing in a desired module and selecting the module returned by a search bar. In some embodiments, the type of module is selected by copying a module already on the DSP module grid 300.

Figure 3B:
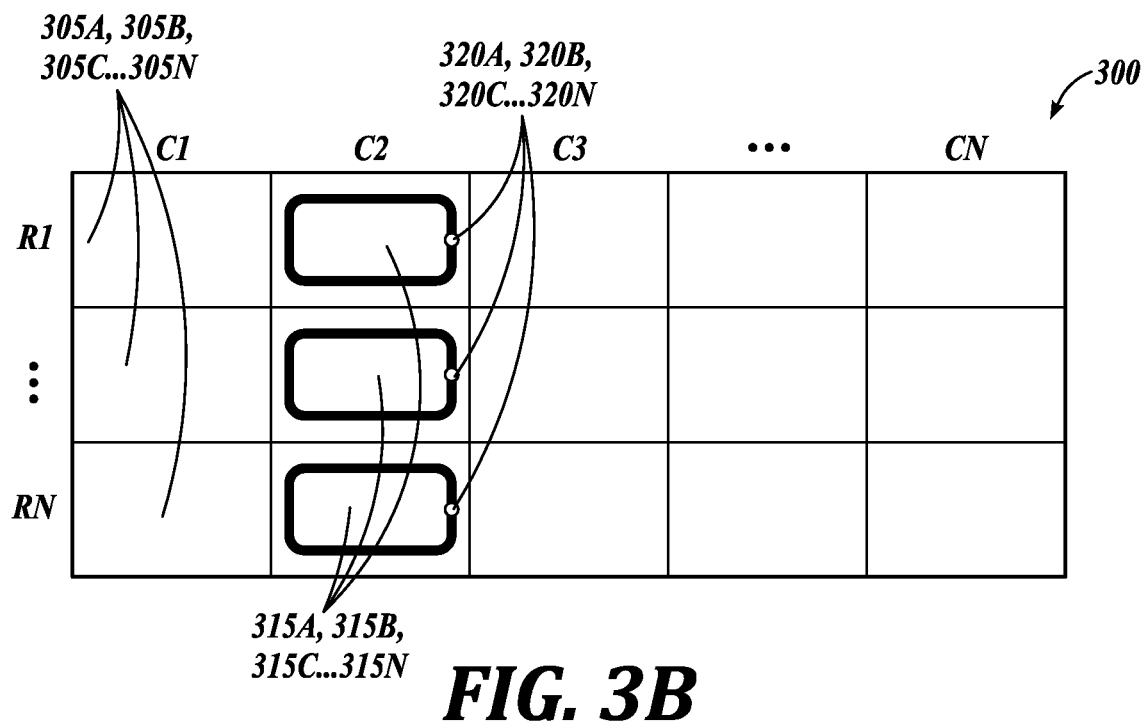

In FIG. 3B, after a type of module is selected, each blank cell (310A, 310B, 310C . . . 310N of FIG. 3A) is filled with a single module 315A, 315B, 315C of the type of module selected. In this manner, modules 315A, 315B, and 315C are all the same type of module. In some embodiments, each module includes one or more nodes 320A, 320B, 320C . . . 320N.

Figure 3C:
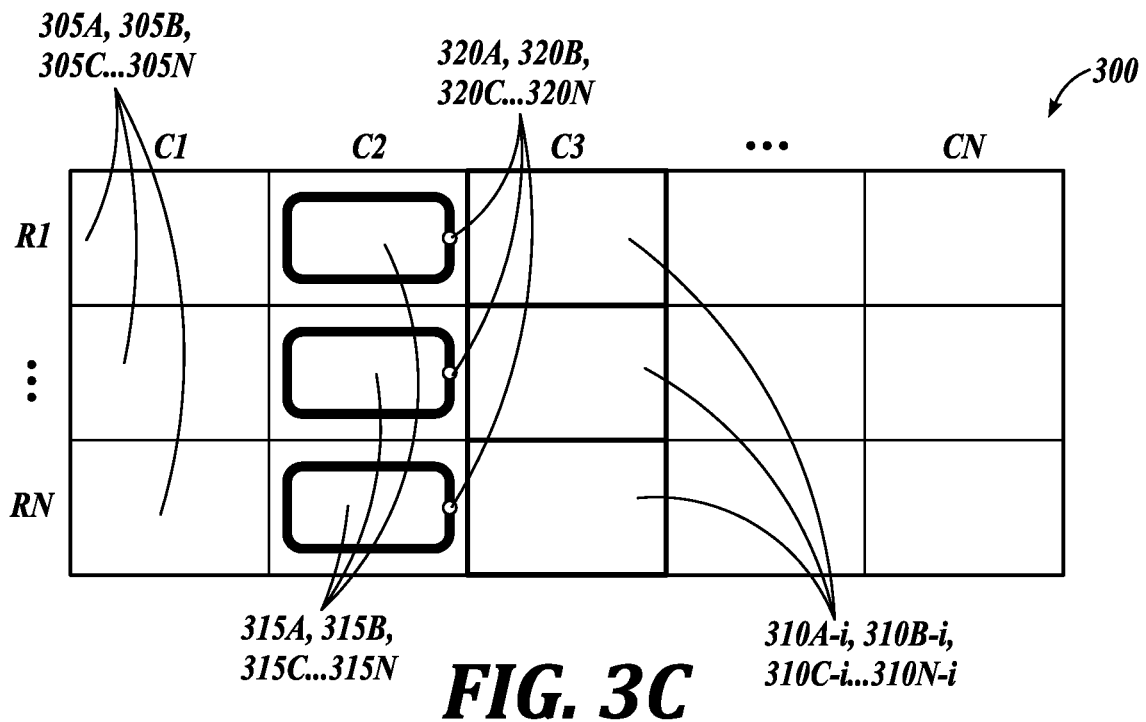
Figure 3D:
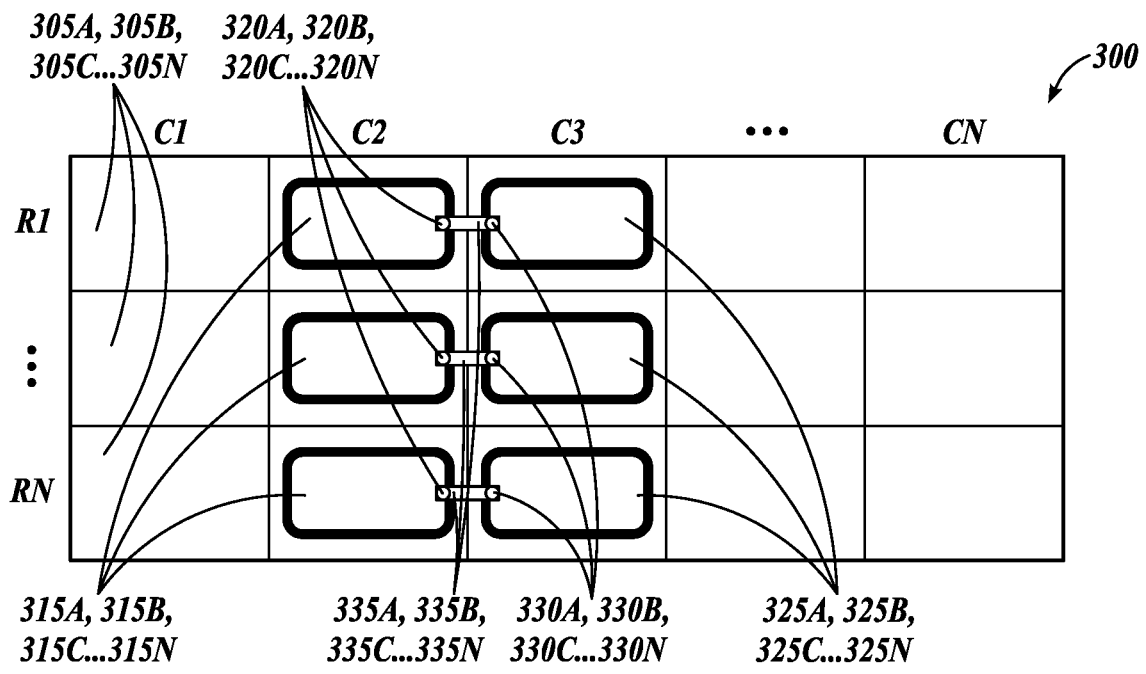

In FIG. 3C a second group of one or more blank cells 310A-i, 310B-i, 310C-i . . . 310N-i is selected, as shown in FIG. 3C as bolded cells 310A-i, 310B-i, 310C-i . . . 310N-i. In some embodiments, the second group of one or more blank cells 310A-i, 310B-i, 310C-i . . . 310N-i is directly adjacent to the one or more blank cells 310A, 310B, 310C . . . 310N in FIG. 3A. In some embodiments, the second group of one or more blank cells 310A-i, 310B-i, 310C-i . . . 310N-i may be located anywhere on DSP module grid 300. In some embodiments, the second group of one or more blank cells 310A-i, 310B-i, 310C-i . . . 310N-i may be non-consecutive. In some embodiments, a second type of module is selected from the plurality of modules. In some embodiments, the second type of module may be the same type as the first type of modules 315A, 315B, 315C . . . 315N. In such embodiments, the second type modules 325A, 325B, 325C . . . 325n (as shown in FIG. 3D) may be copied and pasted into the second group of one or more blank cells 310A, 310B, 310C . . . 310N. In some embodiments, when adding the modules 315A, 315B, 315C . . . 315N, the adjacent group of cells (second group of one or more blank cells 310A-i, 310B-i, 310C-i . . . 310N-I are automatically selected. It should be understood that any number of modules of any number of types may be selected in this manner and copied into adjacent cells. In some embodiments, when the modules are copied and pasted, their connections are maintained.

In FIG. 3D, second type module 325A, 325B, 325C . . . 325D automatically fill each cell of the second group of one or more blank cells 310A, 310B, 310C . . . 310N. In some embodiments, the second type modules 325A, 325B, 325C . . . 325D are a different type from the first type modules 315A, 315B, 315C . . . 315N. In some embodiments, the second type modules 325A, 325B, 325C . . . 325D each have one or more nodes 330A, 330B, 330C . . . 330N. In some embodiments, when the first type modules 315A, 315B, 315C . . . 315N and the second type modules 325A, 325B, 325C . . . 325D are compatible with one another (e.g., include one or more inputs configured to couple with one or more outputs, etc.), connections 335A, 335B, 335C . . . 335N automatically form between the first type modules 315A, 315B, 315C . . . 315N and the second type modules 325A, 325B, 325C . . . 325D. In some embodiments, the first type modules 315A, 315B, 315C . . . 315N and the second type modules 325A, 325B, 325C . . . 325D may be selected together and further pasted in other blank cells of the DSP module grid. In such embodiments, the connections 335A, 335B, 335C . . . 335N are maintained in both the original first type modules 315A, 315B, 315C . . . 315N and the second type modules 325A, 325B, 325C . . . 325D and the copied first type modules 315A, 315B, 315C . . . 315N and the second type modules 325A, 325B, 325C . . . 325D.

Figure 4:
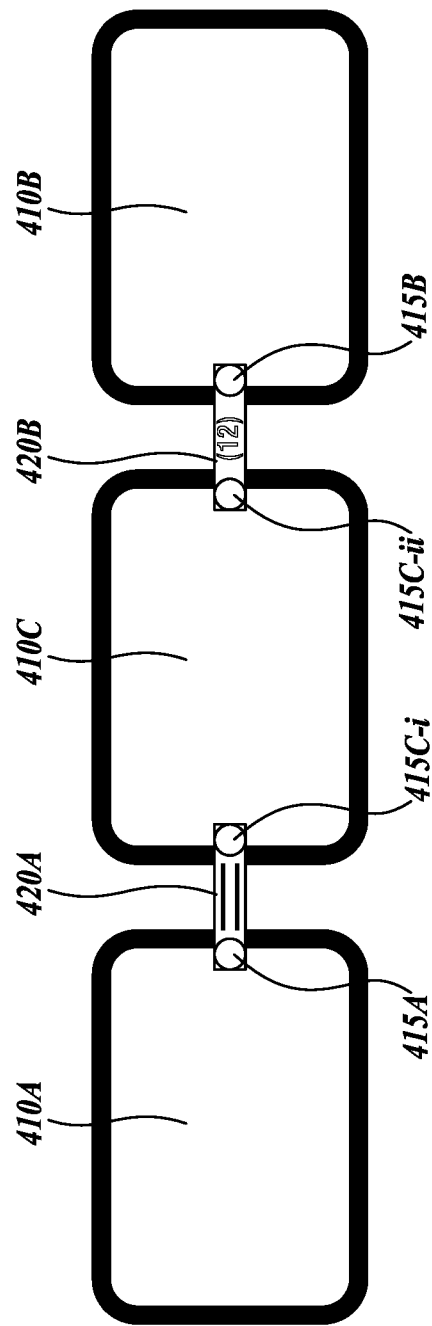
FIG. 4 shows a first module, a second module, and a third module, having a plurality of connections, in accordance with the present technology.

FIG. 4 shows a first module 410A, a second module 410B, and a third module 410C, having a plurality of connections 420A, 420B, in accordance with the present technology. In some embodiments, the DSP module grid (such as DSP grid 100, 200, or 300 described herein) does not include visible cells (such as cells 105, 205, or 305 as described herein). In such embodiments, the first module 410A, a second module 410B, and a third module 410C may still align in a grid, even if visible gridlines are not present. The first module 410A, a second module 410B, and a third module 410C may be collectively referred to herein as a plurality of modules 410.

In some embodiments, each connection 420A, 420B between the plurality of modules 410 represents one or more nodes of a type of node. For example, as illustrated in FIG. 4, the connection 420A between the first module 410A and the third module 410C represents two nodes of a first type of node. Further, the connection 420B between the third module 410C and the second module 410B represents twelve nodes of a second type of node. It should be understood that the first type of node and the second type of node may be the same. In some embodiments, the type of node may be selected from an input, an output, or a combination thereof. As shown in FIG. 4, the first module 410A includes two output channels, represented as a node 415A having a single connection 420A with two meter indicators to the input node 415C-i of the third module 410C. The third module 410C includes an output node 415C-ii. Output node 415C-ii includes 12 output channels and has a single connection 420B with 12 meter indicators to the input node 415B of the second module 410B. This allows for clean and concise illustration of the DSP design, without the clutter of each individual channel taking up a single connection between input and output nodes.

Figure 5B:
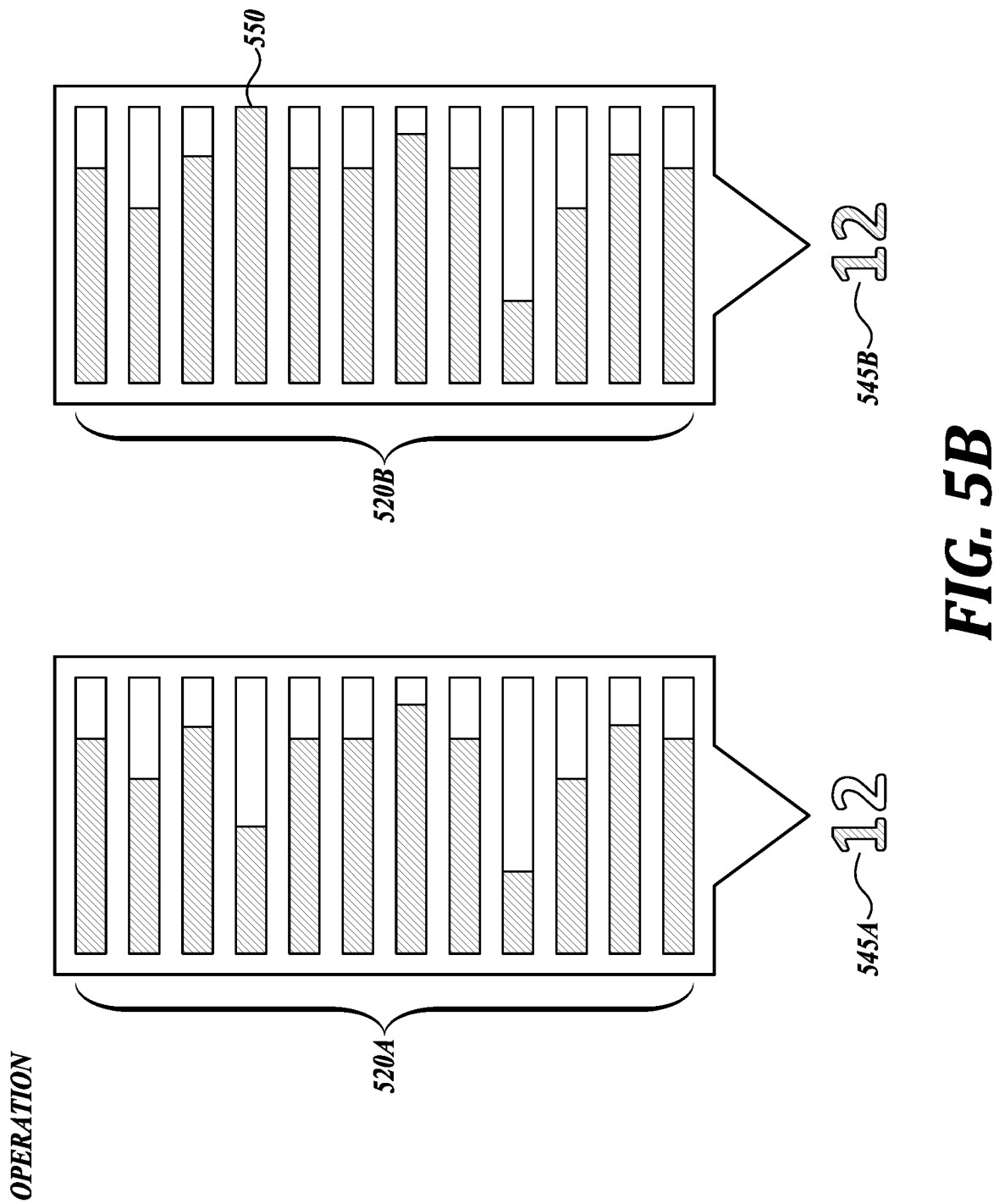
FIG. 5B shows example meters, in accordance with the present technology.

FIG. 5A is a first module 510A, a second module 510B, a third module 510C, and a fourth module 510D having a plurality of meters 545A, 545B, 545C, 545D, 545E, 545F, in accordance with the present technology. In some embodiments, the DSP module grid (such as DSP module grid 100, 200, or 300 as shown herein) includes two modes, a design mode (as shown in FIGS. 1A-1D, 2A-2B, 3A-3D, and 4), and a locked mode (as shown in FIGS. 5A-5C). In some embodiments, the modules 510A, 510B, 510C, 510D, nodes 515A, 515B, 515C, 515D, 515E, 515F, 515G, 515H, 515I absent nodes 525A, 525B, and the illustrated connections make up a DSP design 500. It should be understood that the plurality of modules 510A, 510B, 510C, 510D are representative, and any number of modules having any number of nodes and any number of connections may make up the DSP design 500 as described herein.

In the locked mode, moving, modifying, and disconnecting a plurality of modules 510A, 510B, 510C, 510D of the DSP module grid is prevented. It should be understood that the plurality of modules 510A, 510B, 510C, 510D is merely representative, and any number of modules may be included in the plurality of modules 510A, 510B, 510C, 510D. In some embodiments, the plurality of modules is the plurality of modules shown in FIGS. 1A-1D, 2A-2B, 3A-3D, or 4. In some embodiments, the plurality of modules 510A, 510B, 510C, 510D includes a first module 510A, a second module 510B, a third module 510C, and a fourth module 510D. In some embodiments, while in locked mode, changing node connections and/or node modifiers is prevented.

In some embodiments, in the locked mode, a meter 545A, 545,B, 545C, 545D, 545E, 545F, is shown for every connection of the plurality of connections (not labeled in FIG. 5A to prevent obscuring each meter 45A, 545,B, 545C, 545D, 545E, 545F). In some embodiments, each meter 545A, 545,B, 545C, 545D, 545E, 545F is configured to display a determination of whether each signal level is appropriate or is having a problem such as signal mission or clipping. In some embodiments, in the locked mode, a key 560 is displayed. In some embodiments, the key 560 illustrates whether a connection is clipping (shown in FIG. 5A as a rectangle with diagonal lines) or there is no signal passing through the connection (shown in FIG. 5A as a white rectangle. As shown in FIG. 5A, no connections are currently clipping, and signal is passing through each connection. In some embodiments, the meter 545D may represent any number of types of connections. For example, in FIG. 5A, meter 545D represents twelve separate connections. These connections are also currently not clipping.

FIG. 5B shows an example meters 545A, 545B not clipping, and clipping respectively, in accordance with the present technology. In some embodiments, meters 545A, 545B may be the same meter in two different states (i.e., not clipping, and clipping, respectively). In some embodiments, meters 545A, 545B may be meter 545D of FIG. 5A. In some embodiments, meters 545A, 545B may be two separate meters at the same time where the meter 545A not clipping, and the other meter 545B is clipping.

In some embodiments, when even a single channel of a plurality of channels 520A, 520B of the respective meter 545A, 545B is clipping, the entire connection is considered clipping. In some embodiments, this is displayed by the meter 545A, 545B. In some embodiments, when the meter 545A, 545B is filled (as shown as the "12" of 545B) the connection is clipping. In some embodiments, when the meter is filled, the meter 545B changes color, such as from blue to red, or green to red.

In some embodiments, when a user hovers a mouse over a node a meter 545A for each node is displayed. In some embodiments, each node may include one or more channels. In such embodiments, when a user hovers the mouse over the meter 545A, 545B a channel meter for each channel of the one or more channels is displayed. In this manner, a user may view the meter of each node of the plurality of nodes 520A, 520B to determine which node is clipping and adjust the node (or signal applied to the one or more channels) accordingly. As shown in FIG. 5B, meter 545B is clipping, because clipping channel 550 is clipping.

FIG. 5C is a plurality of modules 510A, 510B, 510C, 510D, each having a node modifier 555A, 555B, 555C, 555D, 555E, 555F, 555G, 555H, to test a signal generator in accordance with the present technology. In some embodiments, the plurality of modules 510A, 510B, 510C, 510D each include one or more nodes 515A, 515B, 515C, 515D, 515E, 515F, 515G, 515H. Connections 520A, 520B, 520C, 520D connect the plurality of nodes 515A, 515B, 515C, 515D, 515E, 515F, 515G, 515H to one another as described herein. Module 510C of the plurality of modules 510A, 510B, 510C, 510D further includes an absent node 525, which is bypassed, as described, and shown herein. In some embodiments, the modules 510A, 510B, 510C, 510D, nodes 515A, 515B, 515C, 515D, 515E, 515F, 515G, 515H, absent node 525, and connections 520A, 520B, 520C, 520D make up a DSP design 500. It should be understood that the plurality of modules 510A, 510B, 510C, 510D are representative, and any number of modules having any number of nodes and any number of connections may make up a DSP design as described herein.

In some embodiments, in the locked mode, a node modifier 555A, 555B, 555C, 555D, 555E, 555F, 555G, 555H is added to one or more nodes 515A, 515B, 515C, 515D, 515E, 515F, 515G, 515H. In some embodiments, a node modifier 555A, 555B, 555C, 555D, 555E, 555F, 555G, 555H is added to every node 515A, 515B, 515C, 515D, 515E, 515F, 515G, 515H of the plurality of modules 510A, 510B, 510C, 510D. In some embodiments, the node modifier 555A, 555B, 555C, 555D, 555E, 555F, 555G, 555H is configured to generate a tone to determine if the node 515A, 515B, 515C, 515D, 515E, 515F, 515G, 515H is operational or working to the satisfaction of the user. In some embodiments, such as when each module of the plurality of modules represents one or more hardware components, the user may select a node modifier of interest (for example, node modifier 555A) to test a node of interest (such as node 515A of the first module 510A). In such a manner, the user may test the hardware represented by the one or more modules of the plurality of modules 510A, 510B, 510C, 510D with the signal generator to determine whether the one or more modules 510A, 510B, 510C, 510D are operational.

Figure 6:
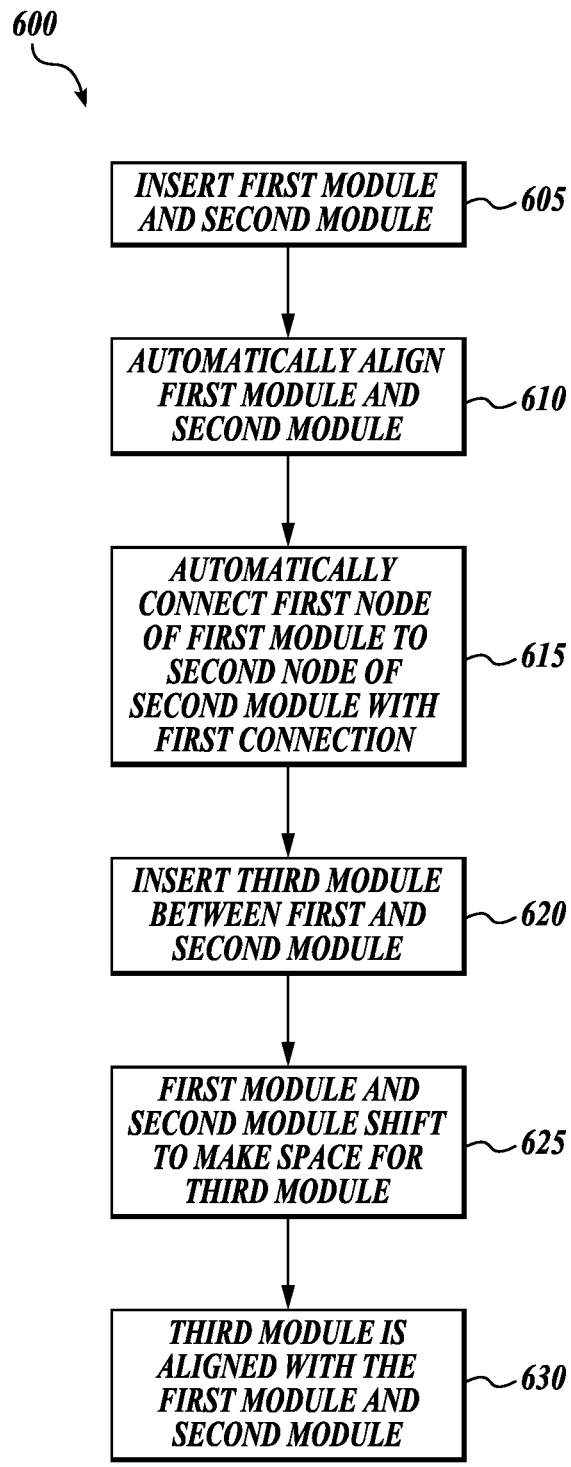
FIG. 6 is an example method for creating a digital signal processing (DSP) module grid on a computer user interface, in accordance with the present technology.

FIG. 6 is an example method 600 for creating a digital signal processing (DSP) module grid on a computer user interface, in accordance with the present technology.

In block 605, a first module (such as first module 110A, 210A, 310A, 410A, or 510A described herein) and a second module (such as second module 110B, 210B, 310B, 410B, 510B described herein) are inserted into a DSP module grid (such as DSP module grid 100, 200, 300 described herein). In some embodiments, the first module and the second module are inserted in the manner as shown and described in FIGS. 3A-3D. In some embodiments, the first module and the second module may be dragged and dropped into the DSP module grid.

In block 610, the first module and the second module may automatically align. In some embodiments, the first module and the second module may automatically align in a row or a column.

In block 615, a first node of the first module is automatically connected with a second node of the second node, with a first connection (such as first connection 120 in FIG. 1A). In some embodiments, the first connection may represent any number of channels of the first node of the first module and any number of channels of the second node of the second module being connected. For example, if the first nodes had three channels, and the second node had three channels, a single connection could represent all three channels of the first node and all three channels of the second node being connected.

In block 620, a third module (such as third module 110C, 210C, 310C or 410C described herein) is inserted into the DSP module grid. In some embodiments, the third module is inserted in the manner as shown and described in FIGS. 3A-3D. In some embodiments, the third module may be dragged and dropped into the DSP module grid.

In block 625, the first module and the second module shift to make space for the third module, as shown in FIG. 1B. In some embodiments, the first module and the second module shift the number of cells needed to accommodate the third module. In some embodiments, only the first module or the second module shift to accommodate the third module. In some embodiments, a user may replace a module by selecting a cell in the DSP module grid that already includes a module and inserting a new module into the grid. In such embodiments, the new module would replace the module that was originally in the cell of the DSP module grid.

In block 630, the third module is automatically aligned with the first module and the second module, as shown in FIG. 1B. In some embodiments, the first module, second module, and third module may be aligned in a row or a column.

Figure 7:
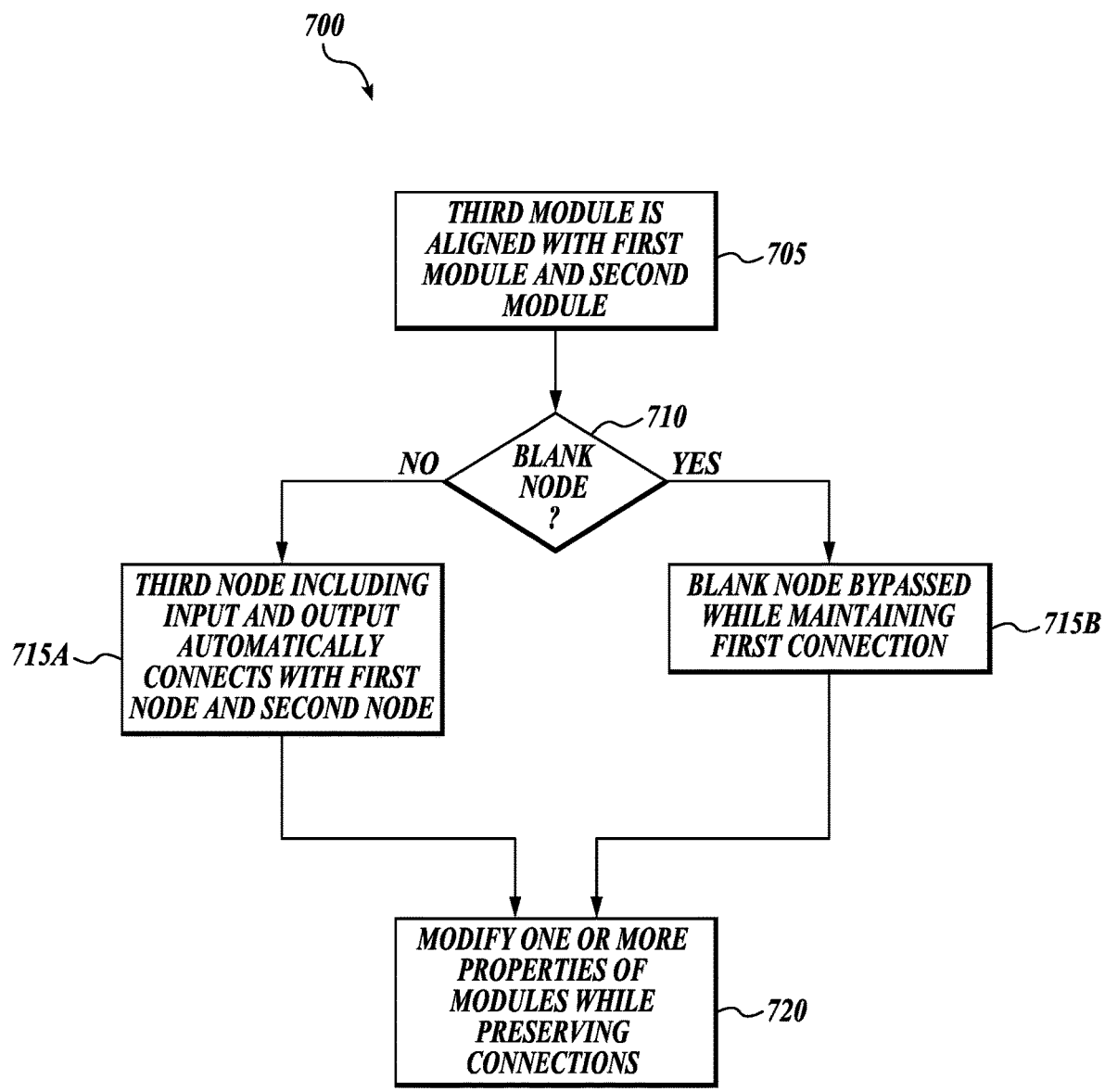
FIG. 7 is an example method for creating a digital signal processing (DSP) module grid on a computer user interface, in accordance with the present technology.

FIG. 7 is an example method 700 for creating a digital signal processing (DSP) module grid on a computer user interface, in accordance with the present technology. In some embodiments, block 705 of method 700 is the same as block 630 in method 600. In such embodiments, method 700 may take place directly after method 600.

In block 705, the third module is automatically aligned with the first module and the second module, as shown in FIG. 1B. In some embodiments, the first module, second module, and third module may be aligned in a row or a column. In some embodiments, the third module includes a third node, as shown in FIGS. 1B and 1C. In some embodiments, the third node includes an input (such as input 115C-i in FIG. 1B) and an output (such as output 115C-ii in FIG. 1B).

In decision block 710, it is determined whether the third node of the third module is an absent node (such as absent node 125 in FIG. 1C). When the third module does not include an absent node, the method proceeds to block 715A.

In block 715A, a first connection between the input of the third module and the first node of the first module is automatically formed. Further, a second connection between the output of the third module and the second node of the second module is automatically formed. In this manner, the third module may be inserted into the DSP module grid and automatically incorporated into a DSP design. The method then proceeds to block 720.

In block 720, one or more properties of the first module, the second module, and/or the third module are modified. In some embodiments, the one or more properties of the first module, the second module, and/or the third module are modified as shown and described in FIG. 2A. In some embodiments, modifying the properties of the first module, the second module, and/or the third module can be done without breaking the connections between first module, the second module, and/or the third module. In such embodiments, the connections (i.e., the first connection and the second connection) may be preserved.

Returning to decision block 710, if it is determined that the third module includes an absent node, the method proceeds to block 715B.

In block 715B, the absent node of the third module is bypassed, while maintaining the first connection between the first module and the second module. In some embodiments, this occurs as shown in FIG. 1C. The method then proceeds to block 720.

Figure 8:
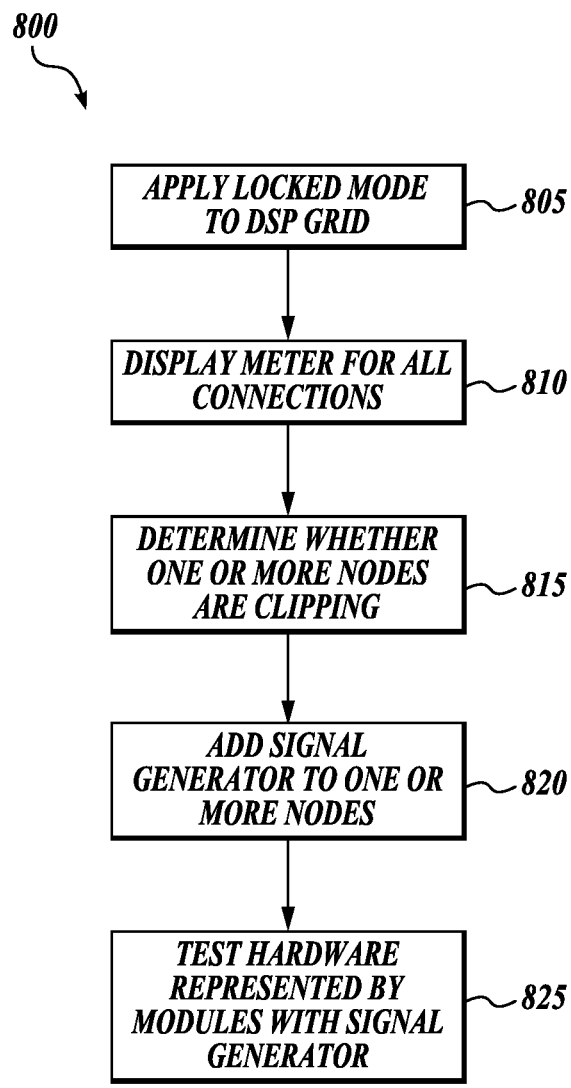
FIG. 8 is an example method for creating a digital signal processing (DSP) module grid on a computer user interface, in accordance with the present technology.

FIG. 8 is an example method 800 for creating a digital signal processing (DSP) module grid on a computer user interface, in accordance with the present technology. In some embodiments, method 800 takes place directly after method 600 and/or method 700.

In block 805, a locked mode is applied to the DSP module grid. In some embodiments, the locked mode is the locked mode as shown and described in FIGS. 5A-5C. In some embodiments, in the locked mode, moving, modifying, and disconnecting the first module, the second module, and the third module of the DSP module grid is prevented.

In block 810, a meter (such as meters 545A, 545,B, 545C, 545D, 545E, 545F of FIG. 5A) is displayed for every connection of the first module, the second module, and the third module. In some embodiments, the meter is displayed for every node of the first module, the second module, and the third module. In some embodiments, a single meter is used to represent a plurality of nodes in a single connection. In some embodiments, block 805 happens simultaneously with block 810.

In block 815, a determination is made as to whether one or more connections (or nodes) are clipping. In some embodiments, this is determined as shown and described in FIGS. 5A-5B. In some embodiments, each meter displays a determination of whether or not the node or connection (made up of one or more channels) is clipping.

In block 820, a signal generator is added to the DSP grid module In some embodiments, node modifiers (such as node modifiers 555A, 555B, 555C, 555D, 555E, 555F, 555G, 555H in FIG. 5C) are displayed at every node in the first module, the second module, and the third module.

In block 825, hardware represented by the first module, the second module, and/or the third module is tested with the signal generator at one or more node modifiers to ensure the hardware is operational. In some embodiments, such as when each module of the plurality of modules represents one or more hardware components, the user may add a signal generator with a node modifier of interest to test a node of interest. In this manner, a user may be able to determine is a given node is operational or performing to a specific standard. It should be understood that in some embodiments, the DSP design is conceptual, that is, there is no physical hardware associated with it. Further, in some embodiments, the DSP design is carried out by software, such as a single computer.

Figure 9:
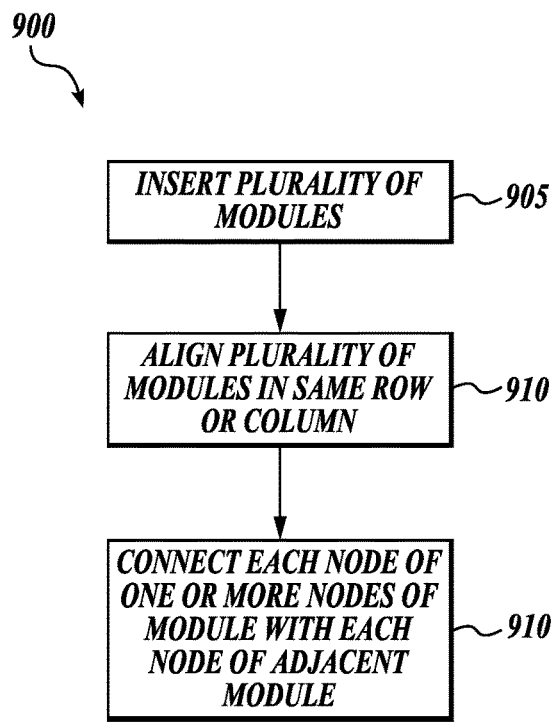
FIG. 9 is an example method for creating a digital signal processing (DSP) module grid on a computer user interface, in accordance with the present technology.

FIG. 9 is an example method 900 for creating a digital signal processing (DSP) module grid on a computer user interface, in accordance with the present technology.

In block 905, a plurality of modules is inserted into the DSP module grid. In some embodiments, the plurality of modules is inserted into the DSP module grid as described in FIG. 3A-3D. In some embodiments, each module of the plurality of modules may be dragged and dropped into the DSP module grid. In some embodiments, the DSP modules can be dragged and dropped after being placed into the DSP module grid. In some embodiments, while a module or a plurality of modules is being dragged, a preview of how the nodes of each dragged module will reconnect or remain connected is shown, so the user is able to determine what the resulting connections will look like based on where the module is moved. In some embodiments, one or more modules of the plurality of modules may be copied and then pasted into the DSP module grid.

In block 910, the plurality of modules is aligned in a same row or a same column.

In block 915, each node of the plurality of modules connect to one or more nodes of an adjacent module. In some embodiments, the adjacent module includes an absent node. In such embodiments, the absent node is bypassed so that a node connects instead with one or more nodes of the next adjacent module in the row or column.

Figure 10:
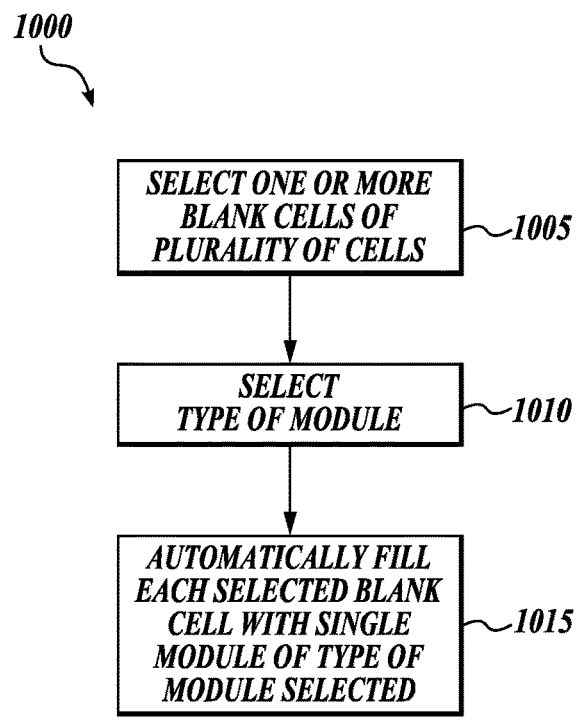
FIG. 10 is an example method for creating a digital signal processing (DSP) module grid on a computer user interface, in accordance with the present technology.

FIG. 10 is an example method 1000 for creating a digital signal processing (DSP) module grid on a computer user interface, in accordance with the present technology. In some embodiments, method 1000 is illustrated in the process diagrams of FIGS. 3A-3D.

In block 1005, one or more blank cells of the plurality of cells in the DSP module grid are selected. In some embodiments, a column or row of the DSP module grid may be selected. In some embodiments, an array of blank cells, such as a two by three cell array may be selected. In some embodiments, non-consecutive cells may be selected.

In block 1010, a type of module is selected. In some embodiments, the type of module is selected from a plurality of modules. In some embodiments, the plurality of modules is organized in a list, drop down menu, or searchable database. In some embodiments, the type of module is selected by copying a module (or plurality of modules) in the DSP module grid.

In block 1015, each selected blank cell is filled with a single module of the type of module selected. In some embodiments, each blank cell is filled with a single module of the same type. In some embodiments, such as when a plurality of modules is copied, each cell is filled with each module of the copied plurality of cells. For example, if two connected modules aligned in a row are copied, and the user selects four blank cells aligned in a row, the selected blank cells will be filled with the two connected modules twice, sequentially. In such embodiments, the connections between the two modules will be maintained. In some embodiments, connections are formed between the newly inserted modules and adjacent modules in the DSP module grid, and/or between the newly inserted modules themselves. In some embodiments, adjacent blank cells are automatically selected to allow the user to repeat the action.

It should be understood that all methods 600, 700, 800, 900, 1000 should be interpreted as merely representative. In some embodiments, process blocks of all methods 600, 700, 800, 900, 1000 may be performed simultaneously, sequentially, in a different order, or even omitted, without departing from the scope of this disclosure.

The present application may reference quantities and numbers. Unless specifically stated, such quantities and numbers are not to be considered restrictive, but representative of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

Embodiments disclosed herein may utilize circuitry in order to implement technologies and methodologies described herein, operatively connect two or more components, generate information, determine operation conditions, control an appliance, device, or method, and/or the like. Circuitry of any type can be used. In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

An embodiment includes one or more data stores that, for example, store instructions or data. Non-limiting examples of one or more data stores include volatile memory (e.g., Random Access memory (RAM), Dynamic Random Access memory (DRAM), or the like), non-volatile memory (e.g., Read-Only memory (ROM), Electrically Erasable Programmable Read-Only memory (EEPROM), Compact Disc Read-Only memory (CD-ROM), or the like), persistent memory, or the like. Further non-limiting examples of one or more data stores include Erasable Programmable Read-Only memory (EPROM), flash memory, or the like. The one or more data stores can be connected to, for example, one or more computing devices by one or more instructions, data, or power buses.

In an embodiment, circuitry includes a computer-readable media drive or memory slot configured to accept signal-bearing medium (e.g., computer-readable memory media, computer-readable recording media, or the like). In an embodiment, a program for causing a system to execute any of the disclosed methods can be stored on, for example, a computer-readable recording medium (CRMM), a signal-bearing medium, or the like. Non-limiting examples of signal-bearing media include a recordable type medium such as any form of flash memory, magnetic tape, floppy disk, a hard disk drive, a Compact Disc (CD), a Digital Video Disk (DVD), Blu-Ray Disc, a digital tape, a computer memory, or the like, as well as transmission type medium such as a digital and/or an analog communication medium (e.g., a fiber optic cable, a waveguide, a wired communications link, a wireless communication link (e.g., transmitter, receiver, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the figures and described in the specification.

In the foregoing description, specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "vertical," "horizontal," "front," "rear," "left," "right," "top," and "bottom," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. The term "based upon" means "based at least partially upon."

The principles, representative embodiments, an "modes of" operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

What is claimed is:

1. A method for creating a digital signal processing (DSP) module grid on a computer user interface, the method comprising:
   inserting a first module and a second module of the DSP module grid;
   automatically aligning the first module with the second module;
   automatically connecting at least a first node of the first module to at least a second node of the second module with a first connection; and
   inserting a third module between the first module and the second module, wherein, when the third module is inserted, the first module and second module automatically shift to make space for the third module, and the third module is automatically aligned with the first module and the second module.

2. The method of claim 1, wherein the third module automatically forms a second connection with the first node and the second node, wherein the third module includes a third node having an input and an output, the input of the third node automatically connects to the first node, and the output of the third module automatically connects to the second node.

3. The method of claim 1, wherein the third module comprises an absent input node and an absent output node, and wherein the method further comprises:
   bypassing the absent input node and the absent output node by the first module and the second module, such that the input absent node and the output absent node are not connected to the first node of the first module or the second node of the second module;
   after inserting the third module, preserving the first connection between the first node of the first module to the second node of the second module; and
   preserving an alignment of the first module, the second module, and the third module.

4. The method of claim 1, wherein the method further comprises:
   modifying one or more properties of the first module, the second module, the third module, or a combination thereof, while preserving the first connection and the second connection of the first module, the second module, and the third module.

5. The method of claim 4, wherein, when the one or more properties are modified, an alignment of the first module, the second module, and the third module is preserved.

6. The method of claim 4, wherein the one or more properties is selected from a group consisting of a number of nodes, a number of absent nodes, a mute status, a multing of a signal, a name of the signal, a name of the module, and a type of node, wherein the module properties are displayable by hovering a mouse over the first module, the second module, and the third module.

7. The method of claim 6, wherein the type of node is selected from a group consisting of a type of input node, or a type of output node.

8. The method of claim 1, wherein, in a locked mode, moving, modifying, and disconnecting the first module, the second module, and the third module of the DSP module grid is prevented.

9. The method of claim 8, wherein, in the locked mode, a meter is displayed for the first connection and the second connection.

10. The method of claim 9, wherein the meter displays a determination of whether the first connection or the second connection is clipping.

11. The method of claim 8, wherein in the locked mode, a signal generator is added to a first node modifier of the first node or a second node modifier of the second node.

12. The method of claim 11, wherein the method further comprises:
    testing hardware represented by the one or more modules of the plurality of modules with the signal generator to determine whether the one or more modules is operational.

13. A method for creating a digital signal processing (DSP) module grid on a computer user interface, wherein the DSP module grid comprises a plurality of cells, wherein the plurality of cells form a plurality of rows and a plurality of columns, the method comprising:
    inserting a plurality of modules into the plurality of cells, each module of the plurality of modules having one or more nodes;
    for the modules that are inserted in a same row, aligning the modules within a same row of the plurality of rows;
    connecting the one or more nodes of a given module of the plurality of modules with the one or more nodes of a first adjacent module of the plurality of modules to form one or more connections; and
    if the given module of the plurality of modules includes an absent node, functionally bypassing the absent node so that the absent node is not connected to a node of the first adjacent module in the same row of the plurality of rows, wherein the first adjacent module maintains one or more connections with a second adjacent module.

14. The method of claim 13, wherein each module of the plurality of modules fills one cell of the plurality of cells of the DSP module grid.

15. The method of claim 13, wherein a number of nodes of each module determines how many cells of the plurality of cells each module fills.

16. The method of claim 13, wherein one or more channels of a type of node of each module of the plurality of modules are represented as a single connection.

17. The method of claim 16, wherein a number of the types of nodes of each module determines how many cells of the plurality of cells each module fills.

18. The method of claim 17, wherein the type of node is selected from a type of input node or a type of output node.

19. The method of claim 13, wherein the one or more nodes of the given module of the plurality of modules connects with one or more nodes of the first adjacent module over any number of blank cells of the plurality of cells.

20. The method of claim 13, wherein the method further comprises:
    selecting one or more blank cells of the plurality of cells;
    selecting a type of module; and automatically filling each selected blank cell of the one or more blank cells with a single module of the type of module selected.

\* \* \* \* \*